United States Patent
Yen et al.

(10) Patent No.: US 8,238,604 B2
(45) Date of Patent: Aug. 7, 2012

(54) SYSTEM AND METHOD FOR VALIDATION OF FACE DETECTION IN ELECTRONIC IMAGES

(75) Inventors: Jonathan Yen, San Jose, CA (US); Tony Quach, Anaheim, CA (US)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 1024 days.

(21) Appl. No.: 12/193,390

(22) Filed: Aug. 18, 2008

(65) Prior Publication Data

US 2010/0040288 A1 Feb. 18, 2010

(51) Int. Cl.
G06K 9/00 (2006.01)

(52) U.S. Cl. .............. 382/103; 382/190

(58) Field of Classification Search .......... 382/103, 382/118, 173, 190

See application file for complete search history.

(56) References Cited

U.S. PATENT DOCUMENTS

| 6,184,926 B1* | 2/2001 | Khosravi et al. ........ 348/239 |
| 6,714,665 B1* | 3/2004 | Hanna et al. ........... 382/117 |
| 2003/0012425 A1* | 1/2003 | Suzuki et al. .......... 382/154 |

OTHER PUBLICATIONS

T. Mita, T. Kaneko, O. Hori, "Joint Haar-like features for face detection," ICCV, pp. 1619-1626, Oct. 2005.
P. Viola, M. Jones, "Rapid object detection using a boosted cascade of simple features," CVPR, pp. 511-518, 2001.
H.A. Rowley, S. Baluja, T. Kanade, "Neural Network-based Face Detection," PAMI, pp. 23-38, 1998.

* cited by examiner

*Primary Examiner* — Andrew W Johns
(74) *Attorney, Agent, or Firm* — SoCal IP Law Group LLP; Steven C. Sereboff; Jonathan Pearce

(57) ABSTRACT

The subject application is directed to a system and method for validation of face detection in electronic images. Image data is first received along with at least one image portion that includes a possible facial depiction. Eye position data, nose position data, and mouth position data are also received. A reference point at a central location of the at least one image portion is then isolated. A width of the image portion is then isolated, and a facial region is isolated in accordance with the eye, nose, and mouth position data. The eye distance is then determined from the received eye position data. The isolated facial region data is then tested against the reference point and eye distance is tested against a width of the image portion. An output is generated corresponding to the accuracy of isolated facial region in accordance with the tests.

12 Claims, 16 Drawing Sheets
(6 of 16 Drawing Sheet(s) Filed in Color)

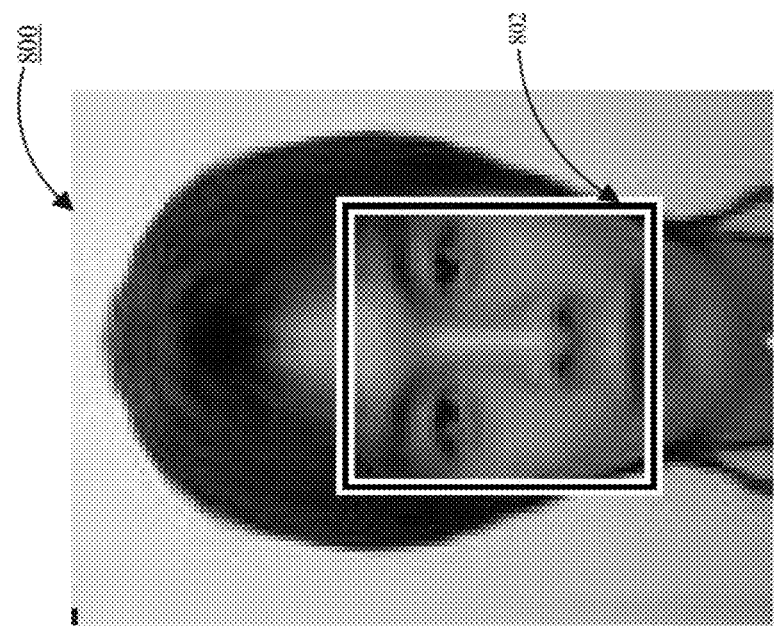

FIGURE 13A-B

SYSTEM AND METHOD FOR VALIDATION OF FACE DETECTION IN ELECTRONIC IMAGES

BACKGROUND OF THE INVENTION

The subject application is directed generally to detection of faces in electronic image data. The application is particularly applicable to verification of detected facial regions resultant from testing performed by other systems.

Electronic images are captured from many sources, including digital still cameras, digital motion cameras, or scanned photographs. It is often desirable to determine whether human faces are present in such images. By way of example, security cameras may be used to determine if humans are present. More sophisticated systems may even identify which humans are present in an image. Applications exist in areas such as building security and airport security. Isolation of facial portions allows such portions to be analyzed more quickly so as to establish the identity of an individual or to create a tangible record showing which individuals may have been present at a given time. Still other applications allow for adjustment or correction of images in a manner designed to maximize facial characteristics. Application of such modification on non-face images may result in a distorted image or in a waste of resources due to unneeded processing.

Many techniques exist to isolate faces in electronic images. Such techniques include looking for relative positions of facial characteristics such as eyes, nose, or mouth. Many such techniques will return a positive indication when a face is detected and will isolate an area believed to contain such facial characteristics.

While image detection is continually improving, it is still less than optimal. Sometimes, positive hits are returned that identify a non-existent face. Other times, a face is missed. Still other times, only a portion of an identified face is isolated. Misidentified facial regions can result in a breach of security, missed identification, or processing or archiving of unneeded data. Human verification, while reliable, is both costly and time consuming.

SUMMARY OF THE INVENTION

In accordance with one embodiment of the subject application, there is provided a system and method for detection of faces in electronic image data.

Further in accordance with one embodiment of the subject application, there is provided a system and method for verification of detected facial regions resultant from testing performed by other systems.

Still further in accordance with one embodiment of the subject application, there is provided a system and method for validation of face detection in electronic images. Image data is first received and at least one image portion of the received image data is received inclusive of a possible facial depiction. Eye position data corresponding to at least one eye position in the at least one image portion, nose position data corresponding to a nose position in the at least one image portion, and mouth position data corresponding to a mouth position in the at least one image portion are then received. A reference point at a central location of the at least one image portion is then isolated. Next, a width of the at least one image portion is isolated. A facial region is then isolated in accordance with the eye position data, the nose position data, and the mouth position data. The eye distance is then determined from the received eye position data. The isolated facial region data is then tested against the reference point and the eye distance is tested against a width of the image portion. An output is then generated corresponding to the accuracy of isolated facial region in accordance with an output of the tests.

In accordance with a further aspect of the subject application, the image portion that is isolated relative to received image data indicative of a possible facial depiction is rectangular, having a width and length. A width of such rectangular is compared with a distance between detected eyes associated with the particular rectangle. A comparison of such measurements is used to verify that there is a true reading of a face depicted in the rectangular area.

Still other advantages, aspects, and features of the subject application will become readily apparent to those skilled in the art from the following description, wherein there is shown and described a preferred embodiment of the subject application, simply by way of illustration of one of the modes best suited to carry out the subject application. As will be realized, the subject application is capable of other different embodiments, and its several details are capable of modifications in various obvious aspects, all without departing from the scope of the subject application. Accordingly, the drawings and descriptions will be regarded as illustrative in nature and not as restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject application is described with reference to certain figures, including:

FIG. 8 is a sample image illustrating face detection rectangles for use in the system for validation of face detection in electronic images according to one embodiment of the subject application;

DETAILED DESCRIPTION OF THE PREFERRED EMBODIMENT

The subject application is directed to a system and method for detections of faces in electronic image data. In particular, the subject application is directed to a system and method for verification of detected facial regions resultant from testing performed by other systems. More particularly, the subject application is directed to a system and method for validation of face detection in electronic images. It will become apparent to those skilled in the art that the system and method described herein are suitably adapted to a plurality of varying electronic fields employing data validation including, for example and without limitation, communications, general computing, data processing, document processing, and the like. The preferred embodiment, as depicted in FIG. 1, illustrates a document processing field for example purposes only and is not a limitation of the subject application solely to such a field.

Figure 1:
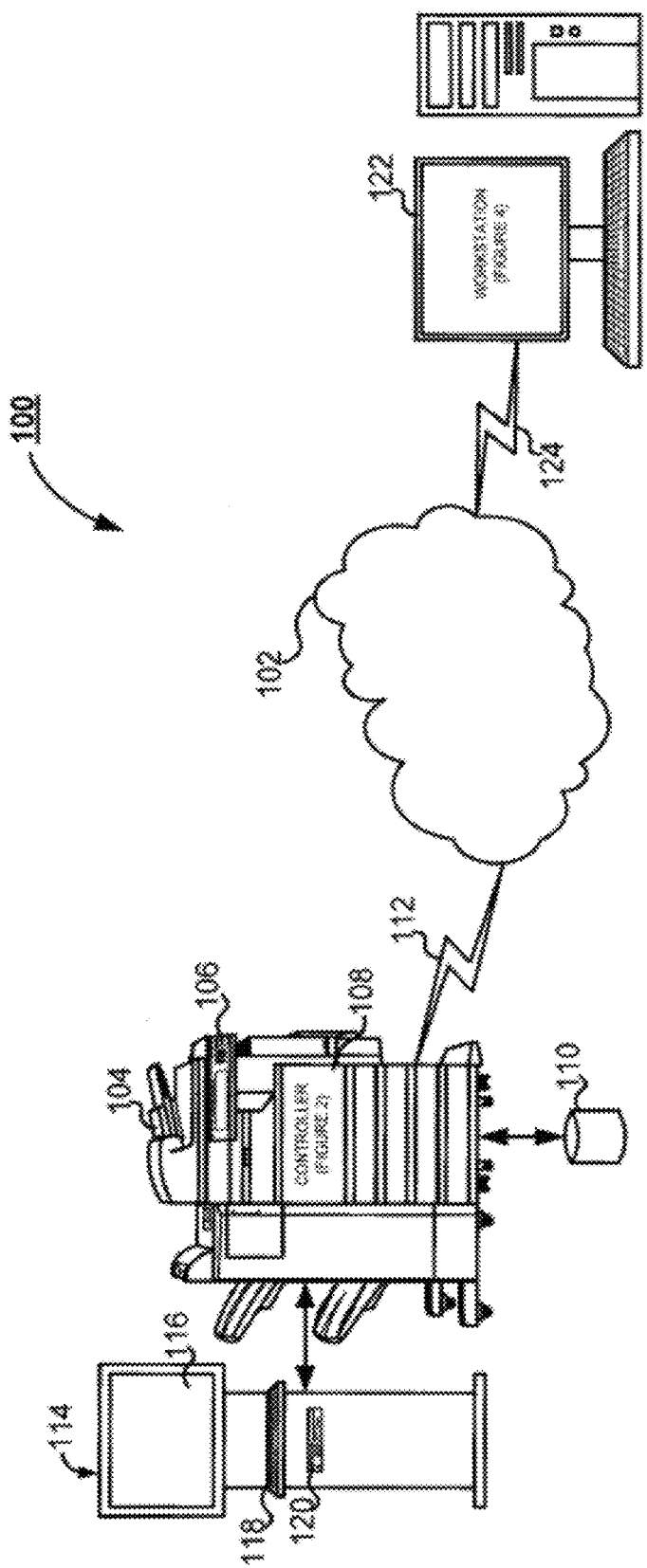
FIG. 1 is an overall diagram of a system for validation of face detection in electronic images according to one embodiment of the subject application.

Referring now to FIG. 1, there is shown an overall diagram of a system 100 for validation of face detection in electronic images in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art that is capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or any suitable combination thereof. In accordance with the preferred embodiment of the subject application, the computer network 102 is comprised of physical layers and transport layers, as illustrated by myriad conventional data transport mechanisms such as, for example and without limitation, Token-Ring, 802.11(x), Ethernet, or other wireless or wire-based data communication mechanisms. The skilled artisan will appreciate that, while a computer network 102 is shown in FIG. 1, the subject application is equally capable of use in a stand-alone system, as will be known in the art.

The system 100 also includes a document processing device 104, which is depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, and the like. Suitable commercially-available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, or any suitable combination thereof and is configured to interact with an associated user, a networked device, or the like.

According to one embodiment of the subject application, the document processing device 104 is suitably equipped to receive a plurality of portable storage media including, without limitation, Firewire drive, USB drive, SD, MMC, XD, Compact Flash, Memory Stick, and the like. In the preferred embodiment of the subject application, the document processing device 104 further includes an associated user interface 106 such as a touch-screen LCD display, touch-panel, alpha-numeric keypad, or the like via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components suitably adapted to present data to the associated user, as are known in the art. In accordance with one embodiment of the subject application, the user interface 106 comprises a display suitably adapted to display one or more graphical elements, text data, images, or the like to an associated user; receive input from the associated user; and communicate the same to a backend component, such as the controller 108, as explained in greater detail below. Preferably, the document processing device 104 is communicatively coupled to the computer network 102 via a communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with one embodiment of the subject application, the document processing device 104 further incorporates a backend component, designated as the controller 108, suitably adapted to facilitate the operations of the document processing device 104, as will be understood by those skilled in the art. Preferably, the controller 108 is embodied as hardware, software, or any suitable combination thereof configured to control the operations of the associated document processing device 104, facilitate the display of images via the user interface 106, direct the manipulation of electronic image data, and the like. For purposes of explanation, the controller 108 is used to refer to any of the myriad components associated with the document processing device 104 including hardware, software, or combinations thereof functioning to perform, cause to be performed, control, or otherwise direct the methodologies described hereinafter. It will be understood by those skilled in the art that the methodologies described with respect to the controller 108 are capable of being performed by any general purpose computing system known in the art, and thus the controller 108 is representative of such general computing devices and is intended as such when used hereinafter. Furthermore, the use of the controller 108 hereinafter is for the example embodiment only, and other embodiments, which will be apparent to one skilled in the art, are capable of employing the system and method for validation of face detection in electronic images of the subject application. The functioning of the controller 108 will be better understood in conjunction with the block diagrams illustrated in FIGS. 2 and 3, explained in greater detail below.

Communicatively coupled to the document processing device 104 is a data storage device 110. In accordance with the preferred embodiment of the subject application, the data storage device 110 is any mass storage device known in the art including, for example and without limitation, magnetic storage drives, a hard disk drive, optical storage devices, flash memory devices, or any suitable combination thereof. In the preferred embodiment, the data storage device 110 is suitably adapted to store document data, image data, electronic database data, or the like. It will be appreciated by those skilled in the art that, while illustrated in FIG. 1 as being a separate component of the system 100, the data storage device 110 is capable of being implemented as an internal storage component of the document processing device 104, a component of the controller 108, or the like such as, for example and without limitation, an internal hard disk drive or the like. In accordance with one embodiment of the subject application, the data storage device 110 is capable of storing images, advertisements, user information, location information, output templates, mapping data, multimedia data files, fonts, and the like.

Illustrated in FIG. 1 is a kiosk 114 communicatively coupled to the document processing device 104 and, in effect, the computer network 102. It will be appreciated by those skilled in the art that the kiosk 114 is capable of being implemented as a separate component of the document processing device 104 or as an integral component thereof. Use of the kiosk 114 in FIG. 1 is for example purposes only, and the skilled artisan will appreciate that the subject application is capable of implementation without the use of the kiosk 114. In accordance with one embodiment of the subject application, the kiosk 114 includes a display 116 and user input device 118. As will be understood by those skilled in the art, the kiosk 114 is capable of implementing a combination user input device/display, such as a touch screen interface. According to one embodiment of the subject application, the kiosk 114 is suitably adapted to display prompts to an associated user, receive instructions from the associated user, receive payment data, receive selection data from the associated user, and the like. Preferably, the kiosk 114 includes a magnetic card reader, conventional bar code reader, or the like suitably adapted to receive and read payment data from a credit card, coupon, debit card, or the like.

The system 100 of FIG. 1 also includes a portable storage device reader 120 coupled to the kiosk 114 and suitably adapted to receive and access myriad different portable storage devices. Examples of such portable storage devices include, for example and without limitation, flash-based memory such as SD, xD, Memory Stick, compact flash, CD-ROM, DVD-ROM, USB flash drives, or other magnetic or optical storage devices, as will be known in the art.

The system 100 illustrated in FIG. 1 further depicts a workstation 122 in data communication with the computer network 102 via a communications link 124. It will be appreciated by those skilled in the art that the workstation 122 is shown in FIG. 1 as a computer workstation for illustration purposes only. As will be understood by those skilled in the art, the workstation 122 is representative of any personal computing device known in the art including, for example and without limitation, a laptop computer, a personal computer, a personal data assistant, a web-enabled cellular telephone, a smart phone, a proprietary network device, or other web-enabled electronic device. The communications link 124 is any suitable channel of data communications known in the art including but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system or wired communications known in the art. Preferably, the workstation 122 is suitably adapted to receive and modify image data, perform color calculations and conversions, generate display data, generate output data, or the like to the document processing device 104 or any other similar device coupled to the computer network 102. The functioning of the workstation 122 will better be understood in conjunction with the block diagram illustrated in FIG. 4, explained in greater detail below.

Figure 2:
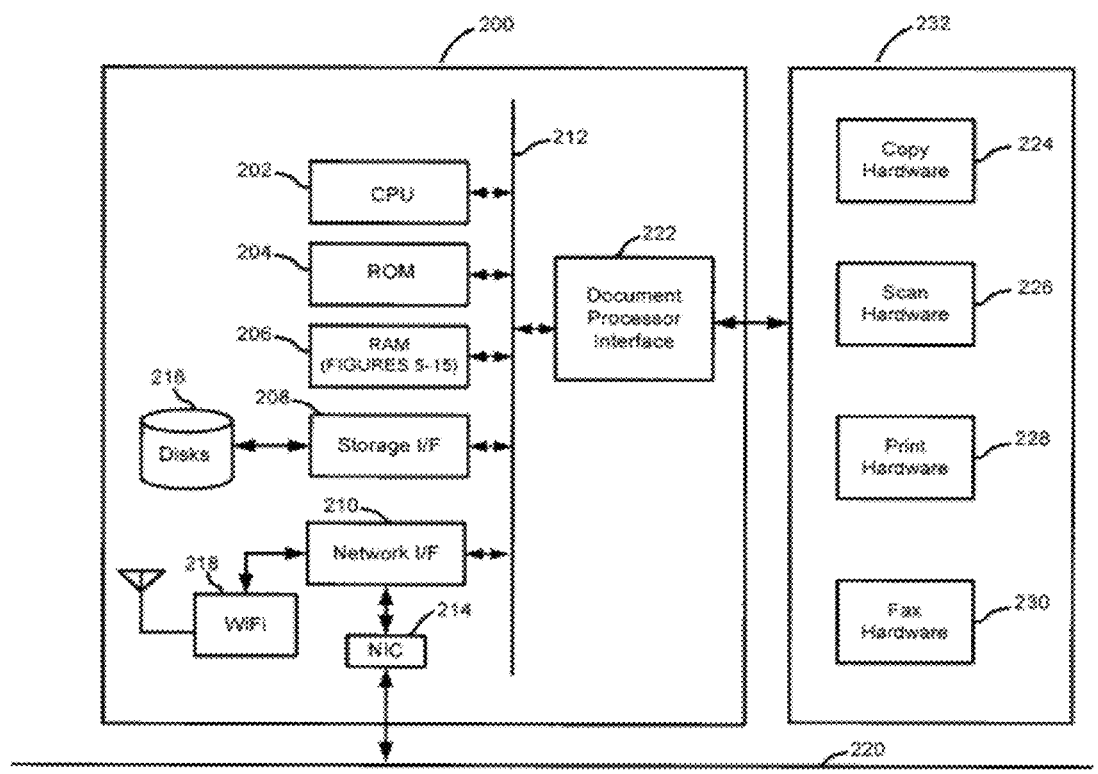
FIG. 2 is a block diagram illustrating controller hardware for validation of face detection in electronic images according to one embodiment of the subject application.

Turning now to FIG. 2, illustrated is a representative architecture of a suitable backend component, i.e., the controller 200, shown in FIG. 1 as the controller 108, on which operations of the subject system 100 are completed. The skilled artisan will understand that the controller 200 is representative of any general computing device known in the art that is capable of facilitating the methodologies described herein. Included is a processor 202 suitably comprised of a central processor unit. However, it will be appreciated that processor 202 may advantageously be composed of multiple processors working in concert with one another. Also included is a non-volatile or read only memory 204, which is advantageously used for static or fixed data or instructions such as BIOS functions, system functions, system configuration data, and other routines or data used for operation of the controller 200.

Also included in the controller 200 is random access memory 206 suitably formed of dynamic random access memory, static random access memory, or any other suitable addressable and writable memory system. Random access memory 206 provides a storage area for data instructions associated with applications and data handling accomplished by processor 202.

A storage interface 208 suitably provides a mechanism for non-volatile, bulk, or long term storage of data associated with the controller 200. The storage interface 208 suitably uses bulk storage such as any suitable addressable or serial storage, such as a disk, optical, tape drive and the like, as shown as 216, as well as any suitable storage medium, as will be appreciated by one of ordinary skill in the art.

A network interface subsystem 210 suitably routes input and output from an associated network, allowing the controller 200 to communicate to other devices. The network interface subsystem 210 suitably interfaces with one or more connections with external devices to the device 200. By way of example, illustrated is at least one network interface card 214 for data communication with fixed or wired networks such as Ethernet, Token-Ring, and the like, and a wireless interface 218 suitably adapted for wireless communication via means such as WiFi, WiMax, wireless modem, cellular network, or any suitable wireless communication system. It is to be appreciated, however, that the network interface subsystem 210 suitably utilizes any physical or non-physical data transfer layer or protocol layer, as will be appreciated by one of ordinary skill in the art. In the illustration, the network interface card 214 is interconnected for data interchange via a physical network 220 suitably comprised of a local area network, wide area network, or a combination thereof.

Data communication between the processor 202, read only memory 204, random access memory 206, storage interface 208, and the network interface subsystem 210 is suitably accomplished via a bus data transfer mechanism, such as illustrated by the bus 212.

Also in data communication with the bus 212 is a document processor interface 222. The document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that the controller 200 suitably operates any or all of the aforementioned document processing operations. Systems accomplishing more than one document processing operation are commonly referred to as multifunction peripherals or multifunction devices.

Figure 3:
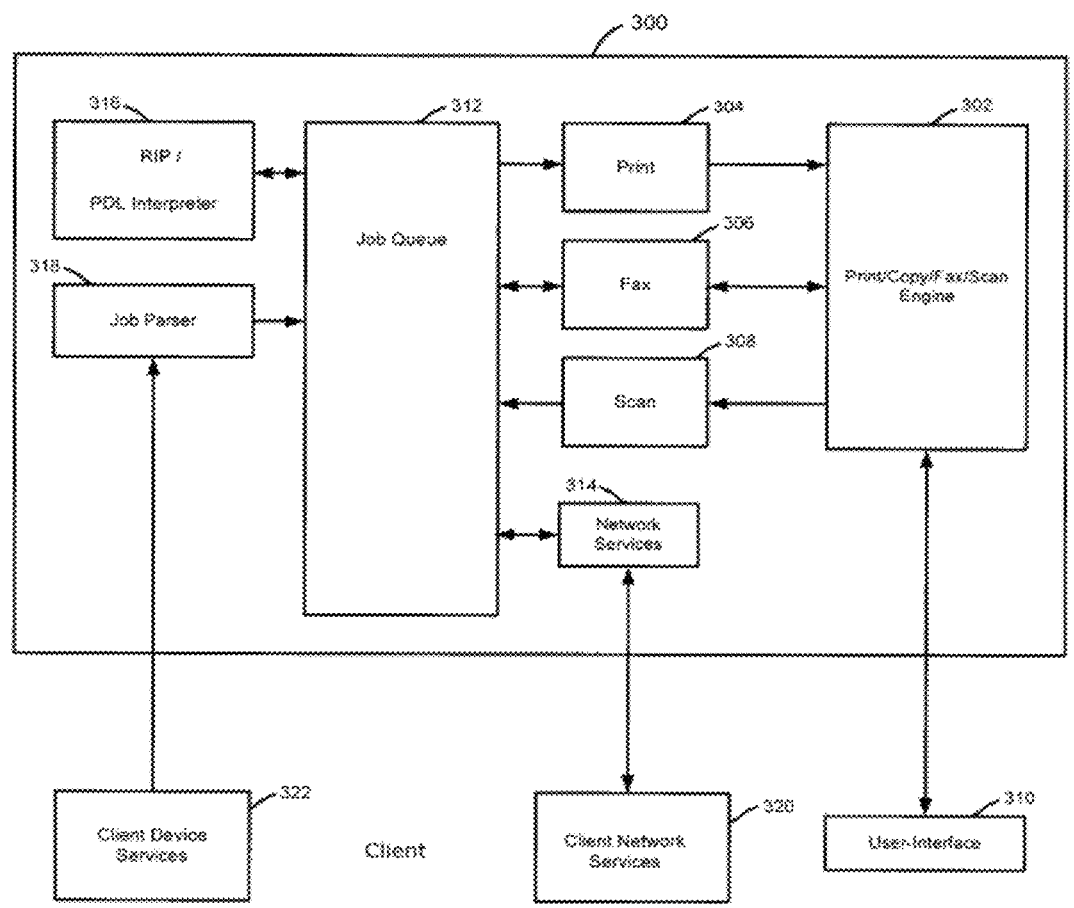
FIG. 3 is a functional diagram illustrating the controller for use in the system for validation of face detection in electronic images according to one embodiment of the subject application.

Functionality of the subject system 100 is accomplished on a suitable document processing device such as the document processing device 104, which includes the controller 200 of FIG. 2 (shown in FIG. 1 as the controller 108) as an intelligent subsystem associated with a document processing device. In the illustration of FIG. 3, controller function 300 in the preferred embodiment includes a document processing engine 302. A suitable controller functionality is that incorporated into the Toshiba e-Studio system in the preferred embodiment. FIG. 3 illustrates suitable functionality of the hardware of FIG. 2 in connection with software and operating system functionality, as will be appreciated by one of ordinary skill in the art.

In the preferred embodiment, the engine 302 allows for printing operations, copy operations, facsimile operations, and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited-purpose document processing devices that perform one or more of the document processing operations listed above.

The engine 302 is suitably interfaced to a user interface panel 310, which panel 310 allows for a user or administrator to access functionality controlled by the engine 302. Access is suitably enabled via an interface local to the controller or remotely via a remote thin or thick client.

The engine 302 is in data communication with the print function 304, facsimile function 306, and scan function 308. These functions 304, 306, 308 facilitate the actual operation of printing, facsimile transmission and reception, and document scanning for use in securing document images for copying or generating electronic versions.

A job queue 312 is suitably in data communication with the print function 304, facsimile function 306, and scan function 308. It will be appreciated that various image forms, such as bit map, page description language or vector format, and the like, are suitably relayed from the scan function 308 for subsequent handling via the job queue 312.

The job queue 312 is also in data communication with network services 314. In a preferred embodiment, job control, status data, or electronic document data is exchanged between the job queue 312 and the network services 314. Thus, suitable interface is provided for network-based access to the controller function 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. The network services 314 also advantageously supplies data interchange with client side services 320 for communication via FTP, electronic mail, TELNET, or the like. Thus, the controller function 300 facilitates output or receipt of electronic document and user information via various network access mechanisms.

The job queue 312 is also advantageously placed in data communication with an image processor 316. The image processor 316 is suitably a raster image process, page description language interpreter, or any suitable mechanism for interchange of an electronic document to a format better suited for interchange with device functions such as print 304, facsimile 306, or scan 308.

Finally, the job queue 312 is in data communication with a parser 318, which parser 318 suitably functions to receive print job language files from an external device, such as client device services 322. The client device services 322 suitably include printing, facsimile transmission, or other suitable input of an electronic document for which handling by the controller function 300 is advantageous. The parser 318 functions to interpret a received electronic document file and relay it to the job queue 312 for handling in connection with the afore-described functionality and components.

Figure 4:
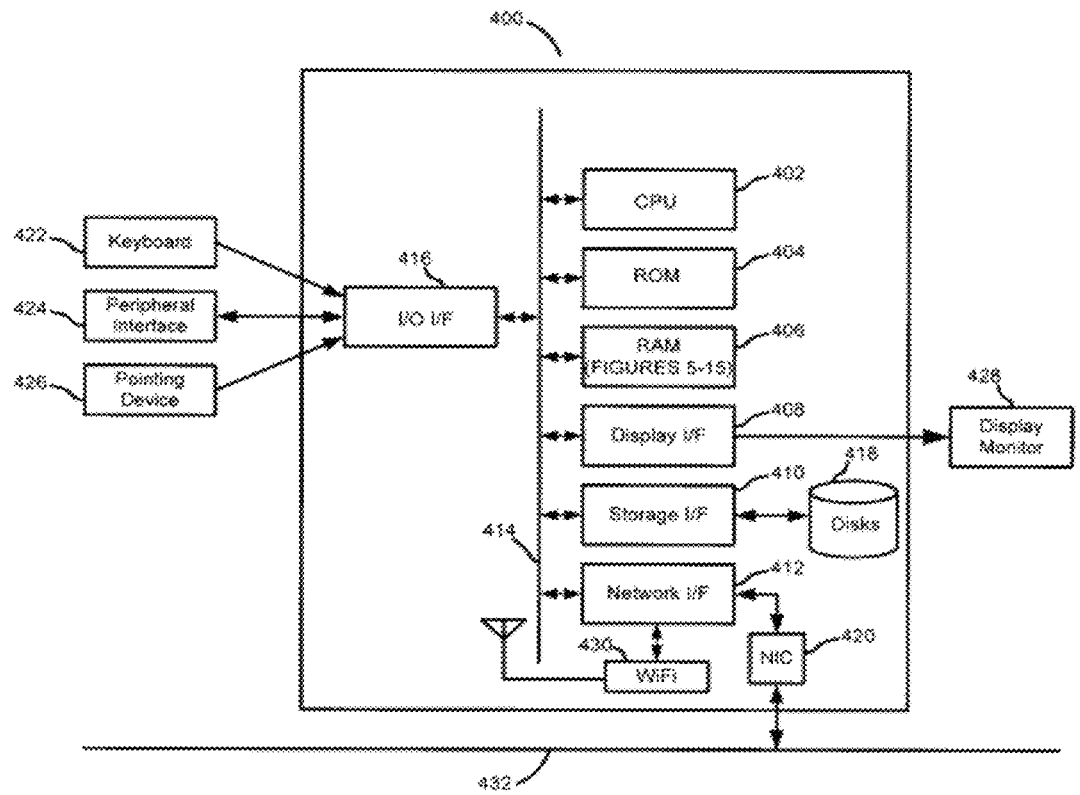
FIG. 4 is a diagram illustrating a workstation for use in the system for validation of face detection in electronic images according to one embodiment of the subject application.

Turning now to FIG. 4, illustrated is a hardware diagram of a suitable workstation 400, shown in FIG. 1 as the workstation 122, for use in connection with the subject system. A suitable workstation includes a processor unit 402, which is advantageously placed in data communication with read only memory 404, suitably non-volatile read only memory, volatile read only memory, or a combination thereof; random access memory 406; a display interface 408; a storage interface 410; and a network interface 412. In a preferred embodiment, interface to the foregoing modules is suitably accomplished via a bus 414.

The read only memory 404 suitably includes firmware such as static data or fixed instructions, such as BIOS, system functions, configuration data, and other routines used for operation of the workstation 400 via the processor 402.

The random access memory 406 provides a storage area for data and instructions associated with applications and data handling accomplished by the processor 402.

The display interface 408 receives data or instructions from other components on the bus 414, which data is specific to generating a display to facilitate a user interface. The display interface 408 suitably provides output to a display terminal 428, suitably a video display device such as a monitor, LCD, plasma, or any other suitable visual output device, as will be appreciated by one of ordinary skill in the art.

The storage interface 410 suitably provides a mechanism for non-volatile, bulk, or long term storage of data or instructions in the workstation 400. The storage interface 410 suitably uses a storage mechanism, such as storage 418, suitably comprised of a disk, tape, CD, DVD, or other relatively higher-capacity addressable or serial storage medium.

The network interface 412 suitably communicates to at least one other network interface, shown as network interface 420, such as a network interface card, and wireless network interface 430, such as a WiFi wireless network card. It will be appreciated by one of ordinary skill in the art that a suitable network interface is comprised of both physical and protocol layers and is suitably any wired system, such as Ethernet, Token-Ring, or any other wide area or local area network communication system; or any wireless system, such as WiFi, WiMax, or any other suitable wireless network system, as will be appreciated by one of ordinary skill in the art. In the illustration, the network interface 420 is interconnected for data interchange via a physical network 432, suitably comprised of a local area network, wide area network, or a combination thereof.

An input/output interface 416 in data communication with the bus 414 is suitably connected with an input device 422, such as a keyboard or the like. The input/output interface 416 also suitably provides data output to a peripheral interface 424 such as a USB, universal serial bus output, SCSI, Firewire (IEEE 1394) output, or any other interface, as may be appropriate for a selected application. Finally, the input/output interface 416 is suitably in data communication with a pointing device interface 426 for connection with devices such as a mouse, light pen, touch screen, or the like.

Figure 5:
FIG. 5 is a sample image illustrating positives and false negatives for use in the system for validation of face detection in electronic images according to one embodiment of the subject application.
Figure 6:
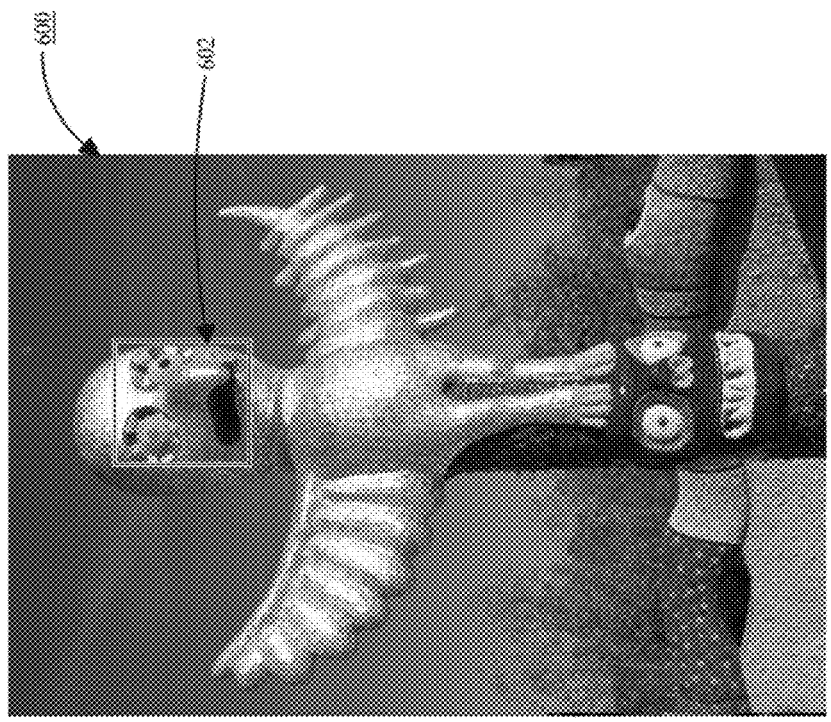
FIG. 6 is a sample image illustrating a false positive for use in the system for validation of face detection in electronic images according to one embodiment of the subject application.

In accordance with one example embodiment of the subject application, the facial detection results that are output by a facial recognition system are suitably compared against a ground truth so as to determine the number of positives (hits), false positives (false alarms), and false negatives (misses) in the image. It will be appreciated by those skilled in the art that the facial detection system typically returns a detection rectangle covering the detected facial region of a positive (hit). FIG. 5 illustrates a sample image 500 having a plurality of detection rectangles 502 superimposed thereon. FIG. 6 illustrates a sample image 600 indicating a false positive (false alarm) as depicted by the superimposed detection rectangle 602. That is, FIG. 6 illustrates an image having a non-human face, i.e. a totem.

Figures 7A, 7B:
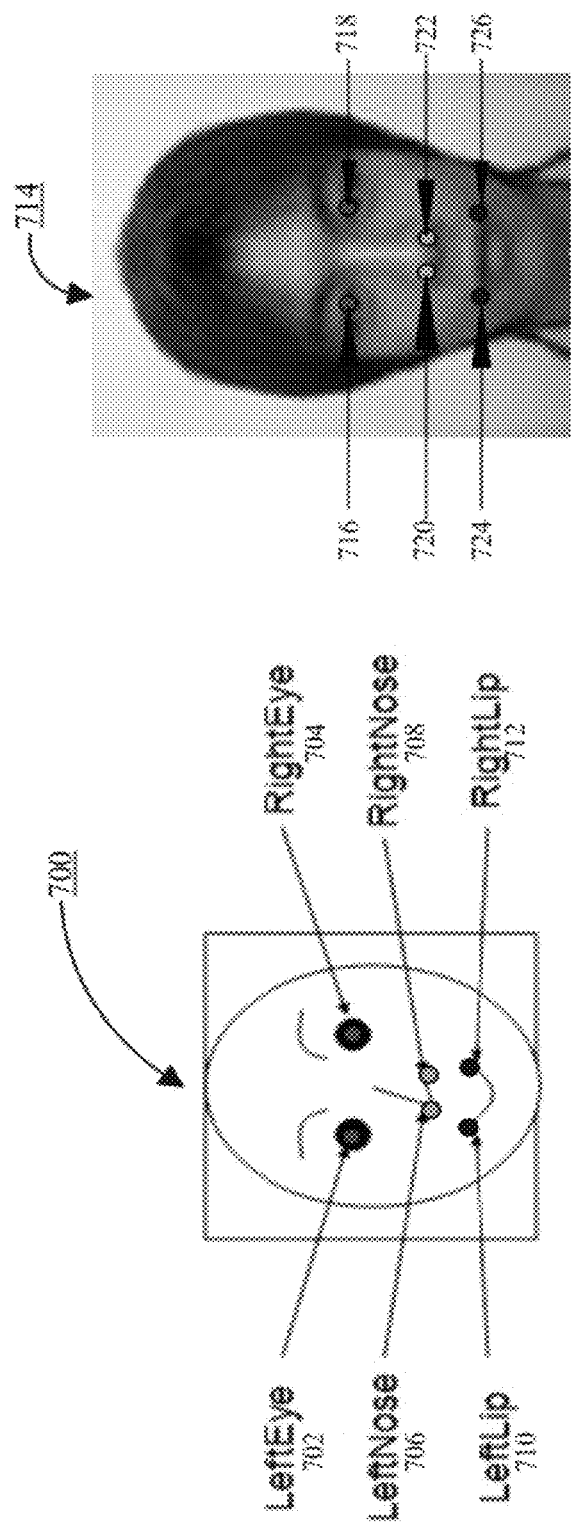
FIG. 7A is a diagram illustrating the image of FIG. 7B for use in the system for validation of face detection in electronic images according to one embodiment of the subject application.
FIG. 7B is a diagram illustrating a sample image for use in the system for validation of face detection in electronic images according to one embodiment of the subject application.

Preferably, the validation of detection results is accomplished by first establishing a ground truth for an image database. That is, for each image in the image database, all human faces in an image are located, and the respective locations of the eyes (pupils), nose (nostrils), and lips are recorded. FIGS. 7A and 7B illustrate a diagram 700 of a suitable image 714 for use in the subject application. The diagram 700 depicts the location of the left eye 702, right eye 704, left nose (nostril) 706, right nose (nostril) 708, left lip 710, and right lip 712. FIG. 7B depicts corresponding notations on the image 714 such that the left eye 716, right eye 718, left nostril 720, right nostril 722, left lip 724, and right lip 726 are marked on the image 714.

According to one embodiment of the subject application, the ground truth is recorded in a text file that includes, for example and without limitation, the image file name; number of faces in the image; and, for each face in the image, the coordinates of its left eye (pupil) 716, right eye (pupil) 718, left nostril 720, right nostril 722, left end of lips 724, and right end of lips 726. A suitable example of such a text file is depicted in TABLE 1, illustrated below:

```
C:\FACE_DATABASE_PPM\FUR_95.ppm,1
#,35,61,61,61,42,81,53,80,37,92,60,92
```

The received result, in contrast, is also capable of being documented in a text file, such as TABLE 2, illustrated below:

```
C:\FACE_DATABASE_PPM\FUR_95.ppm
1$
#0,21,44,71,94,131.586627
```

As shown in TABLE 2, the text file includes, for example and without limitation, image file name; number of faces detected and, for each face, the pose ID (e.g. 0 for frontal and others for rotated faces); coordinates of left, top, right, and bottom of the detection rectangle; and a similarity score. FIG. 8 illustrates an input image 800 depicting a detection rectangle 802 in accordance with one embodiment of the subject application.

Next, the detection result is matched, e.g. compared, with the ground truth. According to one example embodiment of the subject application, the matching process first identifies, for each face indicated in ground truth, a matching detection rectangle. Any identified detection rectangles in the input image are then marked. Thereafter, each of the marked faces in ground truth matched in the detection results are then identified as a "positive," i.e. a validated facial recognition. Each unmarked face in the ground truth is then identified as a "false negative" (miss), i.e. a face in ground truth but not in the detection results. Each unmarked face in the detection results is then identified as a "false positive" (false alarm), i.e. a detection rectangle shown in the detection results but lacking a corresponding face in the ground truth.

Figure 9:
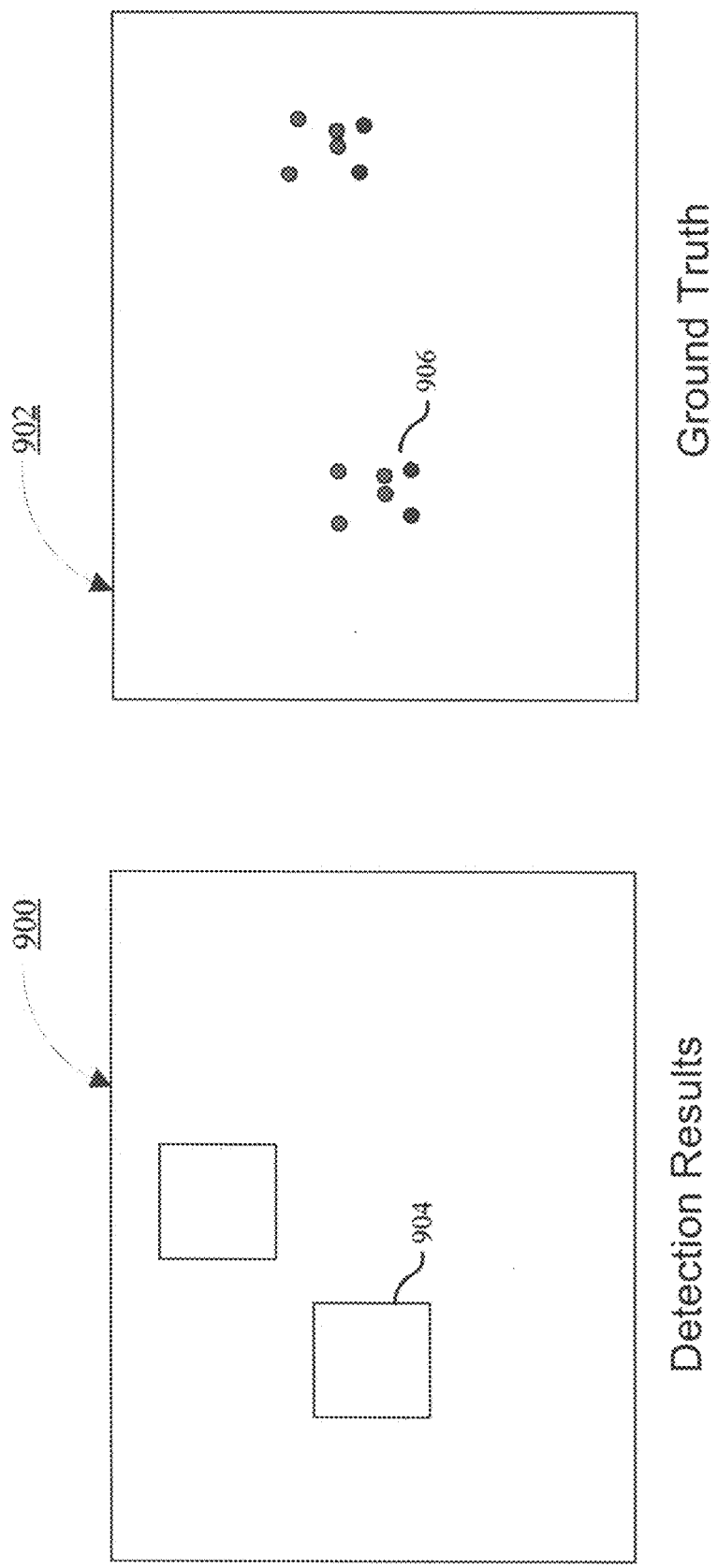
FIG. 9 illustrates sample plots of detection results and ground truth for use in the system for validation of face detection in electronic images according to one embodiment of the subject application.
Figure 10:
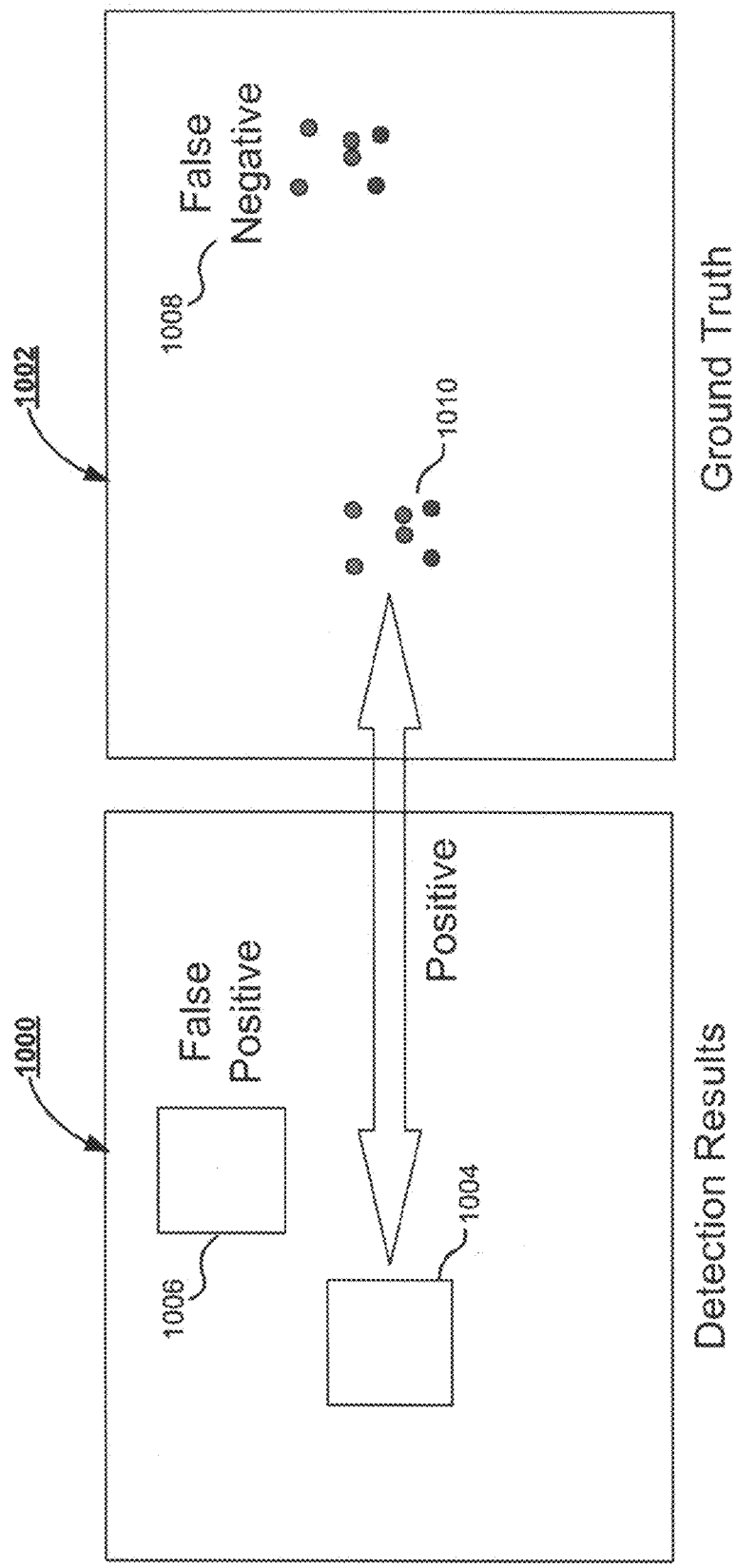
FIG. 10 illustrates sample matching plots of detection results and ground truth for use in the system for validation of face detection in electronic images according to one embodiment of the subject application.

FIG. 9 illustrates a sample detection result 900 and corresponding image in ground truth 902. The detection results 900 include two detection rectangles 904, and the ground truth includes two faces 906. FIG. 10 further defines the above-identified process. As shown in FIG. 10, the detection results 1000 include a "positive" 1004 and a "false positive" 1006. The ground truth 1002 of FIG. 10 illustrates a "positive" 1010 and a "false negative" 1008. That is, the detection results 1000 returned by a suitable facial detection system indicate the presence of two faces 1004 and 1006 in an input image (not shown). The same input image (not shown) in ground truth 1002 also includes two faces 1008 and 1010. However, as shown in FIG. 10, only one of the faces (1004/1010) matches in both the detection results 1000 and the ground truth 1002. The remaining face 1008 in ground truth 1002 is not detected in the detection results 1000, and a face 1006 detected in the detection results 1000 is not actually present in ground truth 1002. Thus, the face 1004 in the detection results 1000 is a "positive," the face 1006 in the detection results 1000 is a "false positive," the face 1010 in ground truth is a "positive," and the face 1008 in ground truth 1002 is a "false negative."

According to one example embodiment of the subject application, the matching of faces from the detection results 1000 to the ground truth 1002 is determined by testing the location and size of the detection rectangles 1004 and 1006. That is, the location is tested by determining if the center of the detection rectangle 1004 or 1006 lies within the convex box formed by eyes, nose, and lips (from ground truth 1002). The size is tested by determining if the size of the detection rectangle 1004 or 1006 is within a predetermined range.

In accordance with the foregoing example embodiment, one suitable approach for testing the location of the detection rectangle 1004 or 1006 is achieved by first calculating the center of the detection rectangle 1004 or 1006 as the average of the four corners. Secondly, the convex box formed by eyes, nose, and lips is calculated by taking the minimum and maximum of all six points in ground truth 1002. The final step is testing if the center (Center X, Center Y) lies within the box represented by the diagonal vertices (Left, Top) and (Right, Bottom). For example:

Left<=CenterX<=Right; Top<=CenterY<=Bottom, where
Left=Min(LeftEyeX,RightEyeX,LeftNoseX,RightNoseX,LeftLipX,RightLipX);
Right=Max(LeftEyeX,RightEyeX,LeftNoseX,RightNoseX,LeftLipX,RightLipX);
Top=Min(LeftEyeY,RightEyeY,LeftNoseY,RightNoseY,LeftLipY,RightLipY); and
Bottom=Max(LeftEyeY,RightEyeY,LeftNoseY,RightNoseY,LeftLipY,RightLipY).

Figure 11:
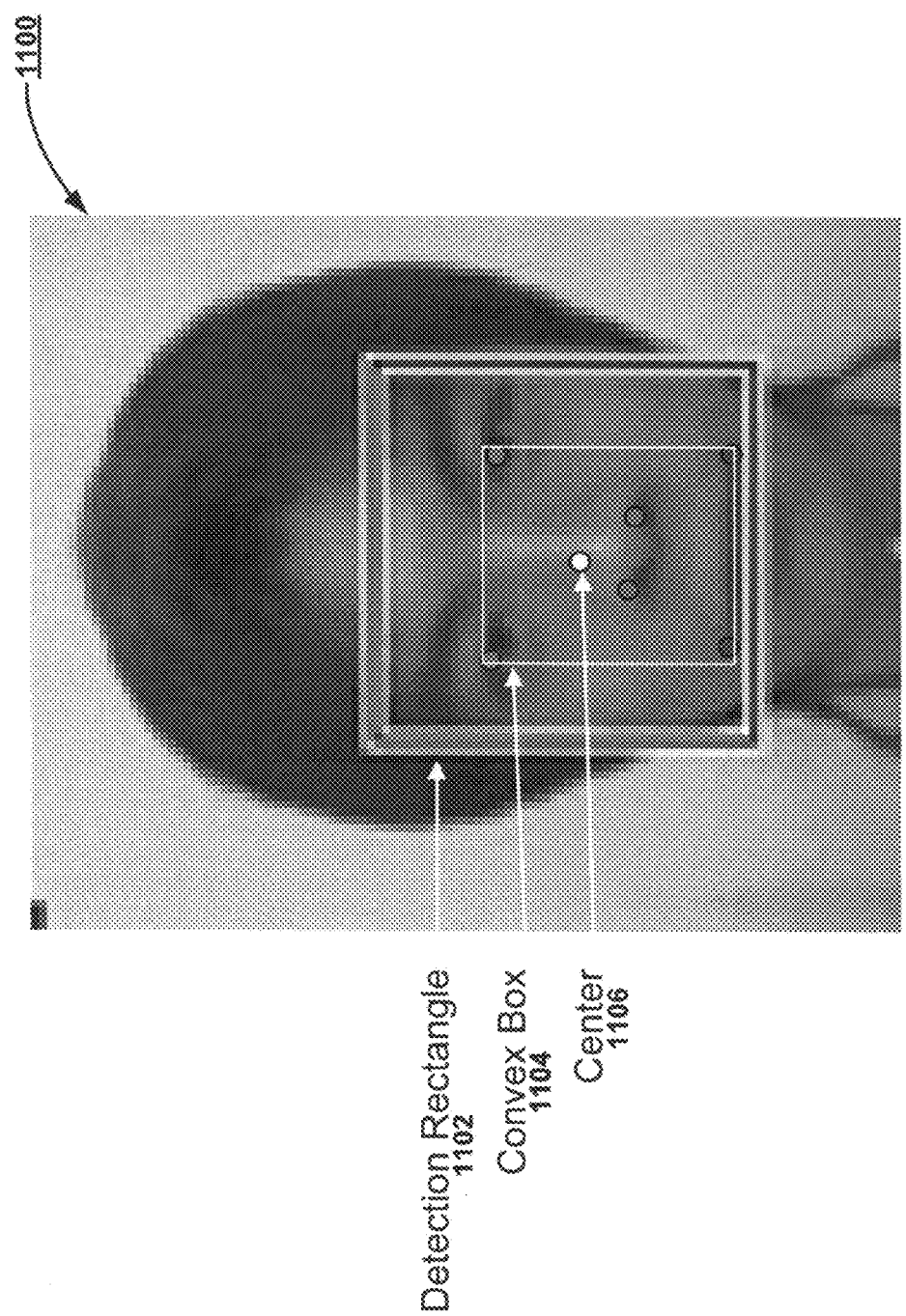
FIG. 11 is a sample image illustrating face detection results for use in the system for validation of face detection in electronic images according to one embodiment of the subject application.

FIG. 11 illustrates the foregoing on an input image 1100. As shown in FIG. 11, the detection rectangle 1102 includes the calculated convex box 1104 formed by the eyes, nose, and lips in ground truth and the center 1106 of the detection rectangle 1102.

With respect to the determination of the size of the detection rectangles, a suitable approach includes first ascertaining the width (DR) of the detection rectangle 1102 and the Euclidean distance (ED) between the two eyes of the image 1100. Thus, the determination that the rectangle falls within a predetermined range is advantageously made if the following equation is true:

$$ED<DR<ED*4.0$$

Figure 12:
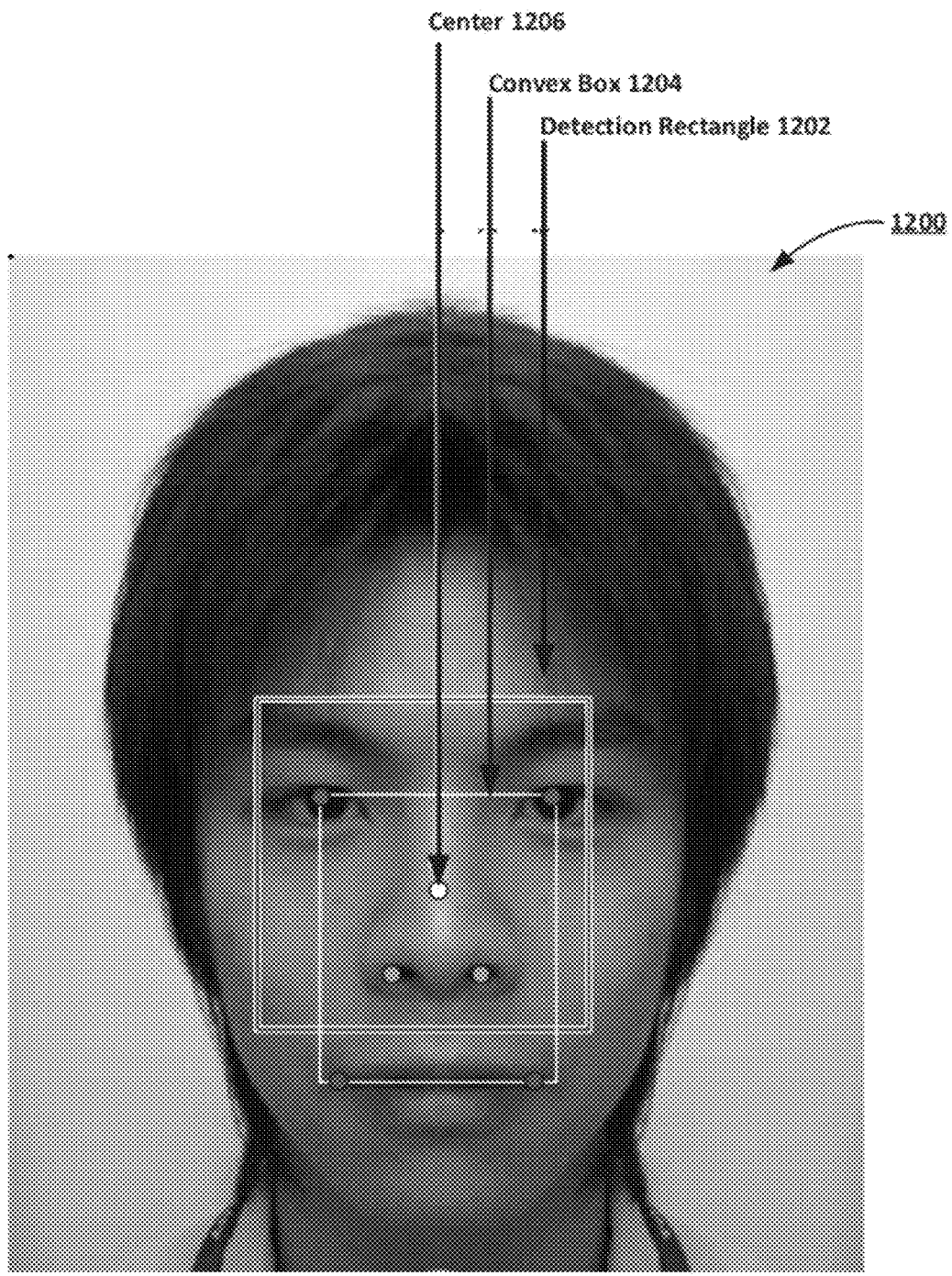
FIG. 12 is a sample image illustrating rotated face detection results for use in the system for validation of face detection in electronic images according to one embodiment of the subject application.

Thus, the skilled artisan will appreciate that the foregoing enables the subject application to apply to any image, regardless of orientation, e.g. rotation. That is, by using the coordinates of the eyes, nostrils, and lips, the subject application is not restricted to a particular image orientation. FIG. 12 illustrates a suitable example image 1200 of a rotated face, including the detection rectangle 1202, the calculated convex box 1204, and the center 1206 of the detection rectangle 1202.

Figures 13A, 13B:
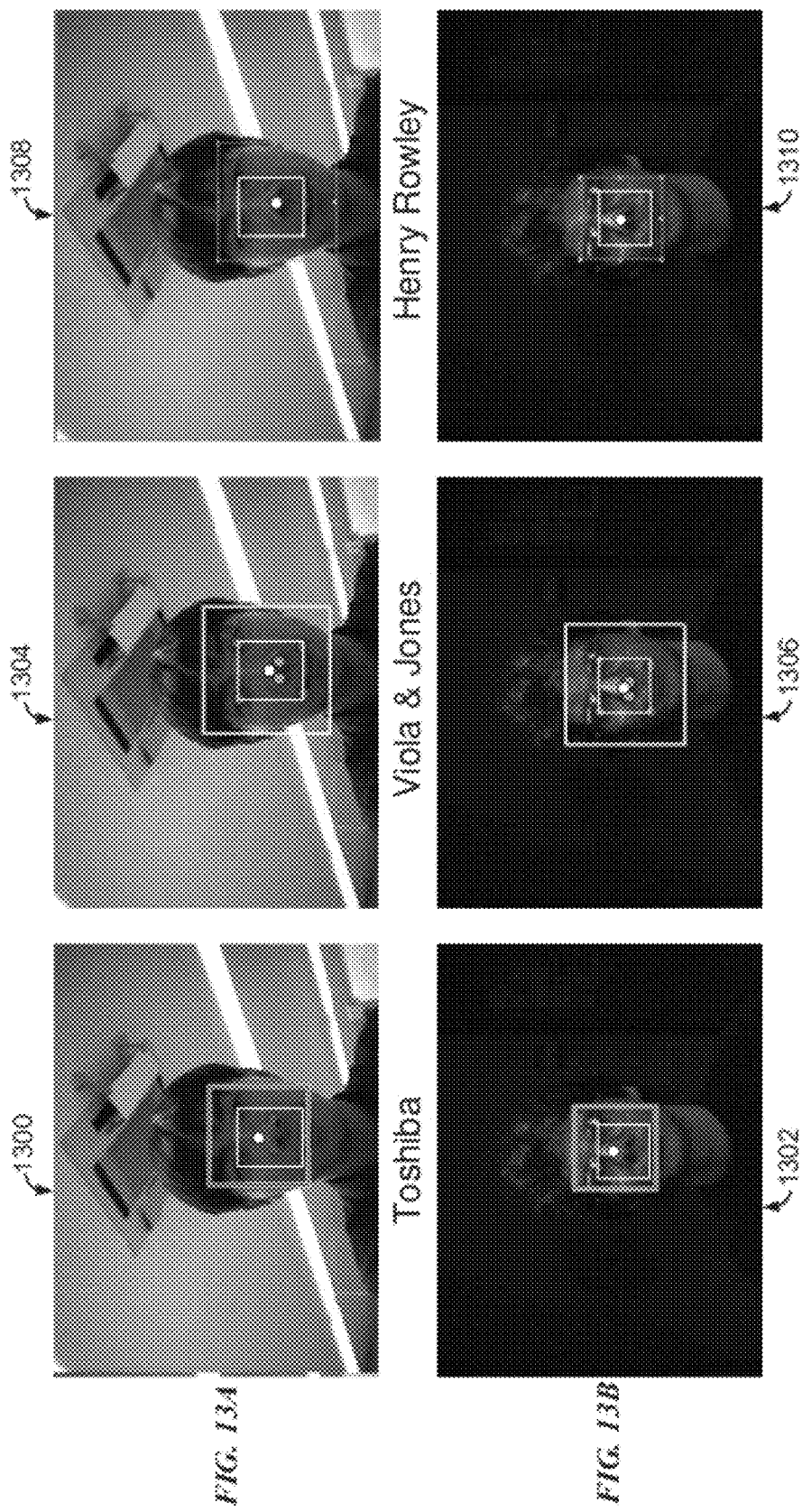
FIG. 13A illustrates a sample image and face detection results for use in the system for validation of face detection in electronic images according to one embodiment of the subject application.
FIG. 13B illustrates a sample image and face detection results for use in the system for validation of face detection in electronic images according to one embodiment of the subject application.

FIGS. 13A and 13B illustrate two series of images output by various facial detection systems. The validation of the facial recognition output by these systems is capable of being determined via the subject application. Images 1300 and 1302 correspond to the output of a first detection system [T. Mita, T. Kaneko, O. Hori, "Joint Haar-like features for face detection," ICCV, pp. 1619-1626, October, 2005], images 1304 and 1306 correspond to the output of a second detection system [P. Viola, M. Jones, "Rapid object detection using a boosted cascade of simple features," CVPR, pp. 511-518, 2001], and images 1308 and 1310 correspond to the output of a third detection system [H. A. Rowley, S. Baluja, T. Kanade, "Neural Network-based Face Detection," PAMI, pp. 23-38, 1998].

According to another example embodiment of the subject application, face detection data corresponding to detected facial regions associated with electronic image data is received by the workstation 122, the controller 108, or other suitable component associated with the document processing device 104 or other suitable computing device, as will be understood by one skilled in the art. Preferably, the face detection data includes area data corresponding to a facial area associated with the detected face. Ground truth data is then received that includes eye data corresponding to at least one eye position, nose data corresponding to a nose position, and mouth data corresponding to a mouth position, as will be understood by those skilled in the art.

The workstation 122, controller 108, or other suitable component associated with the document processing device 104 then identifies the first face based upon the received ground truth data and isolates a central face area according to the eye data, nose data, and mouth data corresponding to the identified face. The workstation 122, controller 108, or other suitable component associated with the document processing device 104 then isolates a center region of the facial area corresponding to the identified face in the received facial detection data. The relative position of the isolated regions are then tested, along with the relative positions of two or more of the eye position data, nose position data, and mouth position data, based upon pre-selected parameters.

The received electronic image data is then analyzed to determine the orientation of the facial region. In the event that the facial region is rotated, a rotational factor is isolated in accordance with the relative position testing results. If the analysis indicates that the facial region is not rotated or following the isolation of the rotational factor, the testing results are analyzed to determine whether a match has been found. As set forth in greater detail above, the facial region is compared to the ground truth so as to determine whether a match is found between the face in ground truth and the face detected in the facial detection data. It will be appreciated by those skilled in the art that FIGS. 5-13B illustrate such comparison and analysis. In the event that the two data sets match, the facial region is identified as positive. If the two sets of data do not match, the facial region is identified as a false negative. This process is repeated until all faces identified in ground truth have been analyzed and identified as either positive or false negatives. The remaining faces in the facial detection data are then identified as false positives, e.g. the facial detection system identified faces where no faces are found in ground truth of the associated image. Thereafter, an output is generated that corresponds to the accuracy of detected facial regions in accordance with the identifications and testing results.

Figure 14:
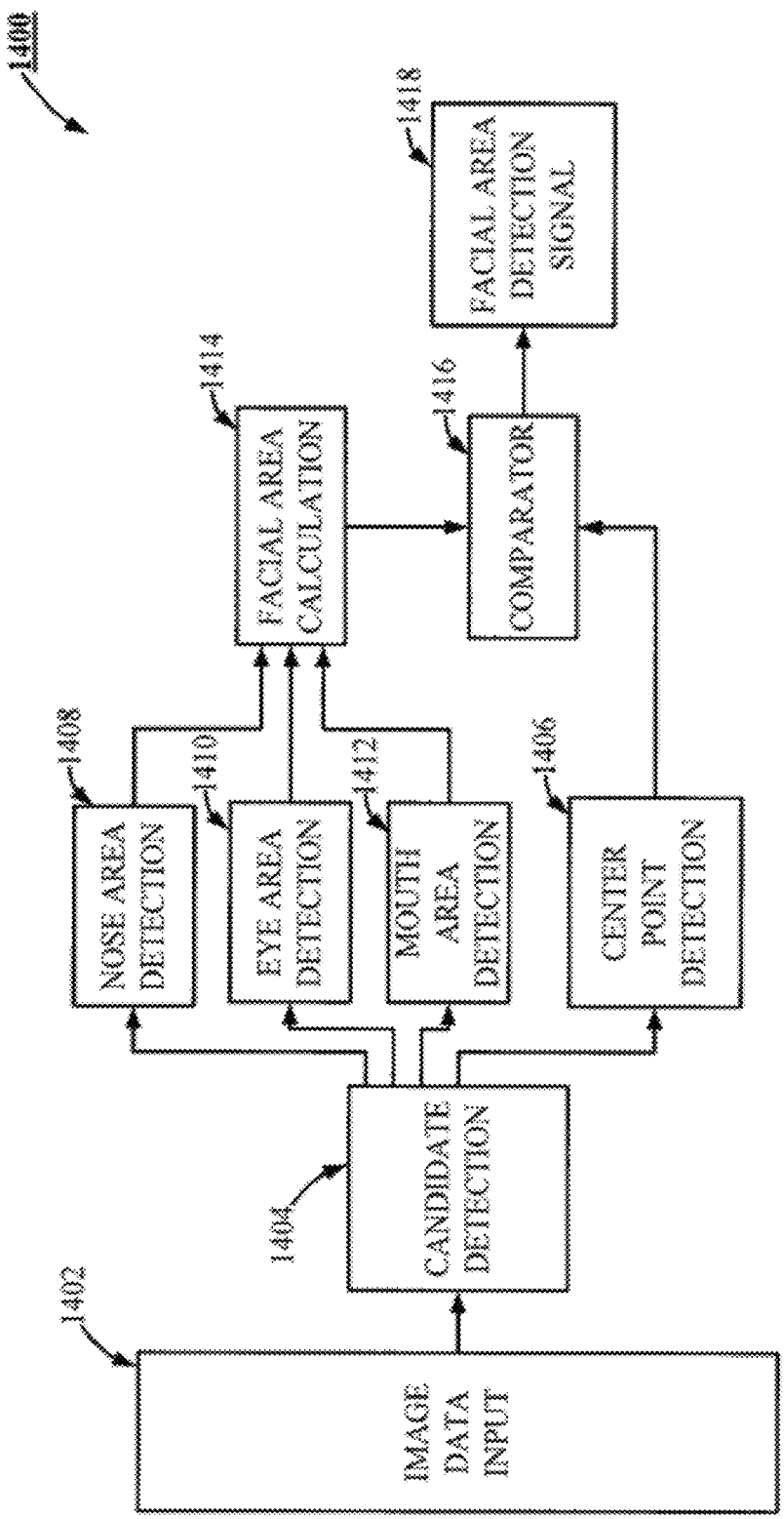
FIG. 14 is a functional block diagram illustrating the system for validation of face detection in electronic images according to one embodiment of the subject application.

Referring now to FIG. 14, there is shown a functional block diagram 1400 of the system for validation of face detection in electronic images in accordance with one embodiment of the subject application. Face detection result data 1402 and ground truth data 1404 are first received. Eye position data 1406 is then received corresponding to at least one eye position in the ground truth 1404. Nose position data 1408 is then received corresponding to a nose position in the ground truth 1404, and mouth position data 1410 is received corresponding to a mouth position in the ground truth 1404. Reference point isolation 1412 is then performed so as to identify a center reference point of the face detection result 1402. Width isolation 1414 of the face detection result 1402 is then conducted to determine a width of the face detection result 1402. Facial region isolation 1416 then occurs based upon the received eye position data 1406, nose position data 1408, and mouth position data 1410. Eye distance determination 1418 is then performed in accordance with the received eye position data 1406. The output of the eye distance determination 1418 is then tested 1420 against the output of the width isolation 1414. The output of the facial region isolation 1416 is then tested 1422 against the output of the reference point isolation 1412. Accuracy output 1424 corresponding to the accuracy of the face detection result 1402 is then generated based upon the results of the testing 1420 of width isolation 1414 against eye distance determination 1418 and the results of the testing 1422 of the size of the facial region 1416 and the reference point 1412. According to one embodiment of the subject application, the accuracy output 1424 indicates a "false positive," a "false negative," or a "positive," as set forth in greater detail above.

Figure 15:
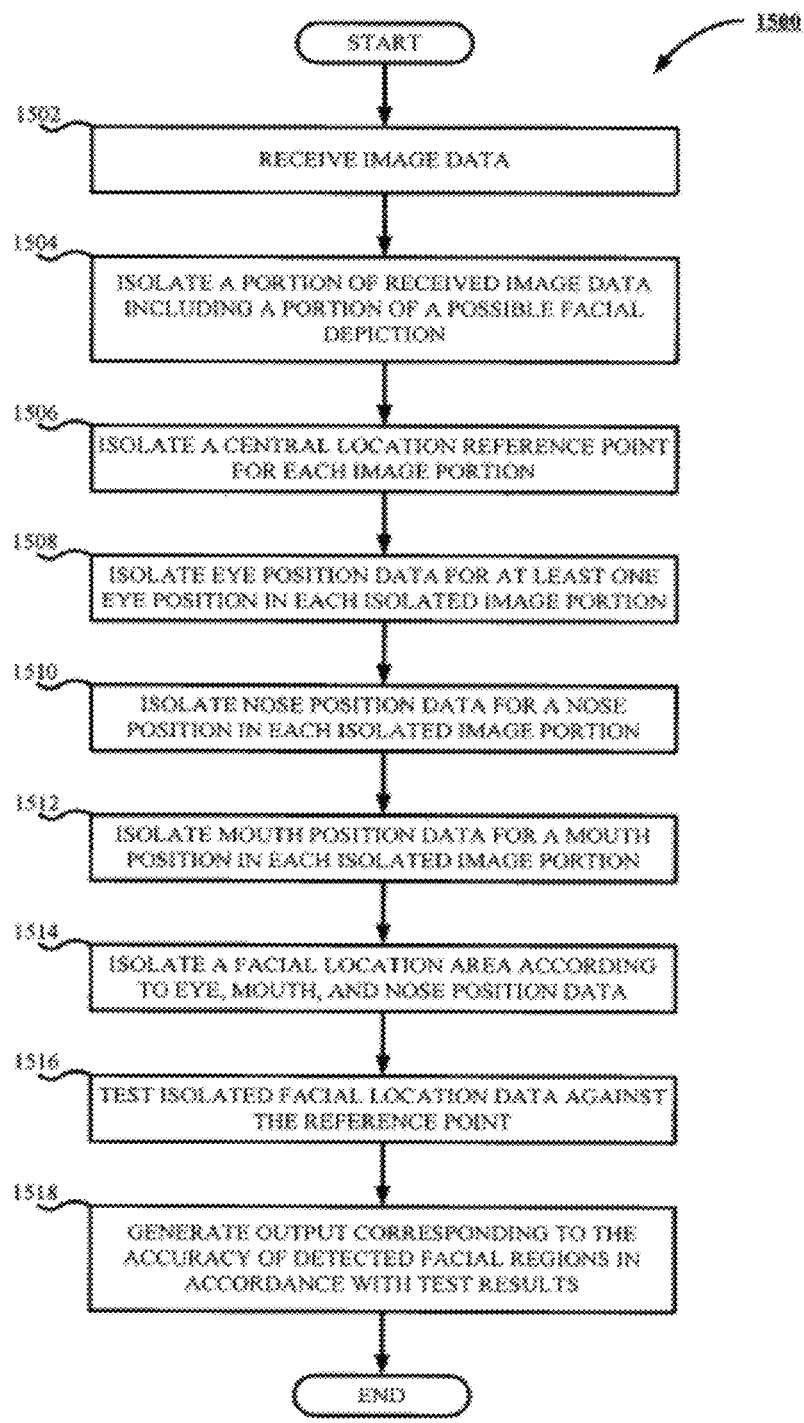
FIG. 15 is a flowchart illustrating a method for validation of face detection in electronic images according to one embodiment of the subject application.

The skilled artisan will appreciate that the subject system 100 and components described above with respect to FIGS. 1-14 will be better understood in conjunction with the methodologies described hereinafter with respect to FIG. 15 and FIG. 16. Turning now to FIG. 15, there is shown a flowchart 1500 illustrating a method for validation of face detection in electronic images in accordance with one embodiment of the subject application. For example purposes only, reference is made hereinafter to the computer workstation 122 performing the methodology of FIG. 15. The skilled artisan will appreciate that the kiosk 114, controller 108, or other suitable component associated with the document processing device 104 are equally capable of implementing the method for validation of face detection in electronic images as set forth in the subject application. Beginning at step 1502, image data is received by the workstation 122 corresponding to a digital image having one or more potential detected facial regions associated therewith. In accordance with one embodiment of the subject application, the electronic image data is received from operations of the document processing device 104, from a portable storage device (not shown), from a digital camera, a website, or the like. Preferably, the image data includes facial data generated by a suitable facial recognition/detection system, as will be appreciated by those skilled in the art. Suitable examples of such systems are referenced above with respect to FIGS. 5-13B and are capable of being implemented as hardware, software, or a suitable combination thereof on the computer workstation 122, the document processing device 104, the kiosk 114, or other suitable device coupled to the computer network 102.

At step 1504, at least one image portion of the received image data is received, which received image portion preferably includes at least a portion of a possible facial depiction. The workstation 122 or other suitable device coupled to the computer network 102 then receives eye position data for at least one eye position in the received image portion at step 1506. At step 1508, nose position data is received for the position of the nose in the received image portion. Mouth position data is then received for the mouth position in the received image portion by the workstation 122 at step 1510. A reference point at a central location of the received image portion is then isolated by the workstation 122 at step 1512. The workstation 122 or other suitable device coupled to the computer network 102 then isolates a width of the received image portion at step 1514. A facial region is then isolated at step 1516 in accordance with the eye position data, the nose position data, and the mouth position data.

At step 1518, the workstation 122 determines the eye distance from the received eye position data. The workstation 122 then tests the determined eye distance against the central location reference point for the isolated image portion at step 1520. At step 1522, the workstation 122 tests the eye distance against a width of the image portion. An output is then generated at step 1524 corresponding to the accuracy of the isolated facial region in accordance with the results of the testing performed at steps 1520 and 1522.

Figure 16:
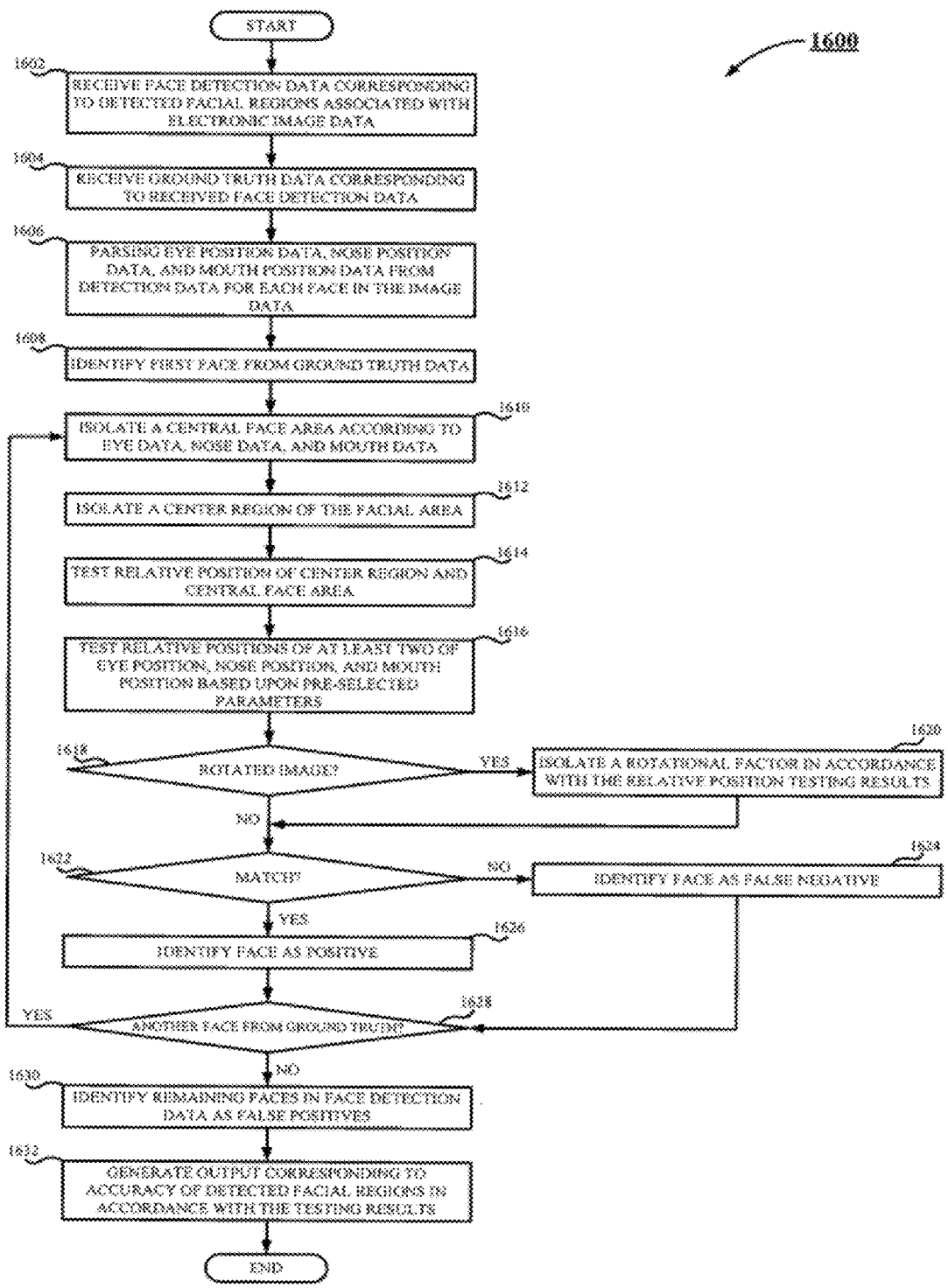
FIG. 16 is a flowchart illustrating a method for validation of face detection in electronic images according to one embodiment of the subject application.

Referring now to FIG. 16, there is shown a flowchart 1600 illustrating a method for validation of face detection in electronic images in accordance with one embodiment of the subject application. For example purposes only, reference is made hereinafter to the computer workstation 122 implementing the methodology set forth in FIG. 16. The skilled artisan will appreciate that the kiosk 114, controller 108, other suitable component associated with the document processing device 104, or any other suitable computing device are equally capable of implementing the subject application.

The method of FIG. 16 begins at step 1602, whereupon the computer workstation receives face detection data corresponding to detected facial regions associated with electronic image data. In accordance with one embodiment of the subject application, the facial detection data is received from a suitable facial detection system, such as those set forth above with respect to FIGS. 5-13B. Preferably, the face detection data includes area data corresponding to a facial area. The ground truth data is also received, preferably with eye data corresponding to at least one eye position, nose data corresponding to a nose position, and mouth data corresponding to a mouth position.

At step 1604, the computer workstation 122 receives ground truth data as will be understood by those skilled in the art. In accordance with one example embodiment of the subject application, the ground truth data corresponds to the received facial detection data. The computer workstation 122 then parses eye position data, nose position data, and mouth position data for each facial region (face) in the ground truth data at step 1606.

At step 1608, the workstation 122 identifies the first face based upon the received ground truth data for further analysis. This analysis begins at step 1610, whereupon the computer workstation 122 isolates a central face area in accordance with the eye position data, nose position data, and mouth position data associated with the identified face. Shown above with respect to FIGS. 5-13B, the isolation performed at step 1610 includes, for example and without limitation, the calculation of the convex box of the face being analyzed, particularly illustrated in FIGS. 11-13B. At step 1612, the computer workstation 122 then isolates a center region of the facial area corresponding to the identified face in the received facial detection data. Continuing with the examples of FIGS. 5-13B, the isolation of the center region of the facial area is capable of being represented, for example and without limitation, by the center of the detection rectangles set forth above.

The relative positions of the center region and the central face area of the face being analyzed are then tested at step 1614. As set forth above with respect to FIGS. 5-13B, a suitable example of such testing includes ascertaining whether the center of the detection rectangle falls within the calculated convex box. At step 1616, the relative sizes of the central face area and the detected facial area are tested by the computer workstation 122.

A determination is then made at step 1618 as to whether the received electronic image data is representative of a rotated image, e.g. a rotated facial region. Upon a determination at step 1618 that the image is rotated, flow proceeds to step 1620, whereupon a rotational factor is isolated in accordance with the relative position testing results of steps 1614-1616. Operations then proceed to step 1622. In the event that an analysis of the facial region indicates that the facial region is not rotated, flow proceeds to step 1622, whereupon a determination is made as to whether the face in ground truth matches the facial region. As set forth in greater detail above, the facial region is compared to the ground truth so as to determine whether a match is found between the face in ground truth and the face detected in the facial detection data. It will be appreciated by those skilled in the art that FIGS. 5-13B illustrate such comparison and analysis.

Upon a determination at step 1622 that a match is found, flow proceeds to step 1626, whereupon the face is identified as a positive, i.e. the facial detection of the current face is validated. Upon a determination at step 1622 that no match is found, i.e. the face in ground truth was not detected by the facial detection system as set forth in the facial detection data, flow proceeds to step 1624, whereupon the face is identified as a false negative, i.e. a miss, by the facial detection system.

Following the identification of the face at step 1624 or 1626, flow proceeds to step 1628, whereupon a determination is made as to whether another face is located in ground truth. When another face remains in ground truth to be analyzed, flow returns to step 1610, whereupon the central face area of the next face is isolated in accordance with corresponding eye data, nose data, and mouth data, as set forth above.

Upon a determination that no additional faces remain for analysis in ground truth, flow progresses from step 1628 to step 1630. At step 1630, the remaining faces in the face detection data are identified as false positives. Stated another way, the faces marked on the detection data as faces but that lack a corresponding face in the ground truth are designated as false positives, i.e. mistakes. Thereafter, the computer workstation 122 generates an output corresponding to the accuracy of the detected facial regions of the electronic image data at step 1632 in accordance with the identifications and testing performed in steps 1610-1630.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications, as are suited to the particular use contemplated. All such modifications and variations are within the scope of the subject application as determined by the appended claims when interpreted in accordance with the breadth to which they are fairly, legally, and equitably entitled.

What is claimed:

1. A facial region detection system, comprising:
   an image data input;
   a detected facial area candidate data input;
   a facial area center point detector operable on a facial area candidate; a nose area data input;
   an eye area data input;
   a mouth area data input;
   a facial region calculator operable on received nose area data, received eye area data and received mouth area data;
   a coincidence comparator operable on a data corresponding to a facial area center point and a facial region;
   a measurement comparator operable on eye distance data corresponding to a distance between two eyes as represented by eye data and on facial area distance data corresponding to a side length associated with the facial area candidate; and
   a facial area detection signal generator operable in accordance with an output of the coincidence comparator and an output of the measurement comparator.

2. The facial detection system of claim 1, wherein the coincidence comparator generates an output in accordance with an overlap of the facial area center point and the facial region.

3. The facial detection system of claim 2, wherein the facial area candidate is rectangular.

4. The facial detection system of claim 3, wherein the facial region is a convex shape.

5. A method for validation of face detection in electronic images, comprising:
   receiving image data;
   receiving at least one image portion of received image data, including at least a portion of a possible facial depiction;
   receiving eye position data corresponding to at least one eye position in the at least one image portion;
   receiving nose position data corresponding to a nose position in the at least one image portion;
   receiving mouth position data corresponding to a mouth position in the at least one image portion;
   isolating a reference point at a central location of the at least one image portion;
   isolating a width of the at least one image portion; isolating a facial region in accordance with eye position data, nose position data, and mouth position data;
   determining eye distance from received eye position data; testing isolated facial region data against the reference point;
   testing eye distance against a width of the image portion; and
   generating an output corresponding to the accuracy of isolated facial region in accordance with an output of the testing steps.

6. The method of claim 5, wherein the at least one image portion is defined as a generally rectangular sub-region of the image data.

7. The method of claim 6, wherein the step of isolating the facial region includes the step of defining the facial region as a convex sub-region of the image data.

8. The method of claim 7, further comprising the step of isolating a rotational factor in accordance with a result of the testing step.

9. A system for validation of face detection in electronic images, comprising:
   means adapted for receiving image data;
   means adapted for receiving at least one image portion of received image data, including at least a portion of a possible facial depiction;
   means adapted for receiving eye position data corresponding to at least one eye position in the at least one image portion;
   means adapted for receiving nose position data corresponding to a nose position in the at least one image portion;
   means adapted for receiving mouth position data corresponding to a mouth position in the at least one image portion;
   means adapted for isolating a reference point at a central location of the at least one image portion; means adapted for isolating a width of the at least one image portion;
   means adapted for isolating a facial region in accordance with eye position data, nose position data, and mouth position data;
   means adapted for determining eye distance from received eye position data; means adapted for testing isolated facial region data against the reference point;
   means adapted for testing eye distance against a width of the image portion; and
   means adapted for generating an output corresponding to the accuracy of isolated facial region in accordance with an output of the testing means.

10. The system of claim 9, wherein the at least one image portion is defined as a generally rectangular sub-region of the image data.

11. The system of claim 10, wherein the means adapted for isolating the facial region includes means adapted for defining the facial region as a convex sub-region of the image data.

12. The system of claim 11, further comprising means adapted for isolating a rotational factor in accordance with a result of the testing means.

* * * * *